(12) United States Patent
Mittricker et al.

(10) Patent No.: US 9,719,682 B2
(45) Date of Patent: Aug. 1, 2017

(54) METHODS AND SYSTEMS FOR CONTROLLING THE PRODUCTS OF COMBUSTION

(71) Applicants: Franklin F. Mittricker, Jamul, CA (US); Loren K. Starcher, Sugar Land, TX (US); Chad C. Rasmussen, Kuala Lumpur (MY); Richard A. Huntington, Houston, TX (US); Frank Hershkowitz, Basking Ridge, NJ (US)

(72) Inventors: Franklin F. Mittricker, Jamul, CA (US); Loren K. Starcher, Sugar Land, TX (US); Chad C. Rasmussen, Kuala Lumpur (MY); Richard A. Huntington, Houston, TX (US); Frank Hershkowitz, Basking Ridge, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 14/326,134

(22) Filed: Jul. 8, 2014

(65) Prior Publication Data

US 2014/0318427 A1 Oct. 30, 2014

Related U.S. Application Data

(63) Continuation of application No. 13/062,442, filed as application No. PCT/US2009/055544 on Aug. 31, 2009, now Pat. No. 9,222,671.

(Continued)

(51) Int. Cl.
*F23N 1/02* (2006.01)
*F23C 9/00* (2006.01)
(Continued)

(52) U.S. Cl.
CPC ............ *F23N 1/022* (2013.01); *F23C 9/00* (2013.01); *F23N 1/08* (2013.01); *F23N 3/002* (2013.01);
(Continued)

(58) Field of Classification Search
CPC . F23C 9/00; F23N 1/022; F23N 5/006; F23N 5/066; F23N 5/022; F23N 1/08;
(Continued)

(56) References Cited

U.S. PATENT DOCUMENTS 2,488,911 A 11/1949 Hepburn et al.
2,884,758 A 5/1959 Oberle
(Continued)

FOREIGN PATENT DOCUMENTS

CA 2231749 3/1998
CA 2645450 9/2007
(Continued)

OTHER PUBLICATIONS

U.S. Appl. No. 14/144,511, filed Dec. 30, 2013, Thatcher et al.
(Continued)

*Primary Examiner* — Jorge Pereiro
(74) *Attorney, Agent, or Firm* — ExxonMobil Upstream Research Company Law Department

(57) ABSTRACT

The present invention relates to methods and systems for controlling a combustion reaction and the products thereof. One embodiment includes a combustion control system having an oxygenation stream substantially comprising oxygen and $CO_2$ and having an oxygen to $CO_2$ ratio, then mixing the oxygenation stream with a combustion fuel stream and combusting in a combustor to generate a combustion products stream having a temperature and a composition detected by a temperature sensor and an oxygen analyzer, respectively, the data from which are used to (Continued)

control the flow and composition of the oxygenation and combustion fuel streams. The system may also include a gas turbine with an expander and having a load and a load controller in a feedback arrangement.

8 Claims, 4 Drawing Sheets

Related U.S. Application Data

(60) Provisional application No. 61/105,331, filed on Oct. 14, 2008.

(51) Int. Cl.
  *F23N 5/00* (2006.01)
  *F23N 5/02* (2006.01)
  *F23R 3/26* (2006.01)
  *F23R 3/34* (2006.01)
  *F23N 1/08* (2006.01)
  *F23N 3/00* (2006.01)

(52) U.S. Cl.
  CPC ............ *F23N 5/006* (2013.01); *F23N 5/022* (2013.01); *F23R 3/26* (2013.01); *F23R 3/346* (2013.01); *F23C 2202/30* (2013.01); *F23L 2900/07001* (2013.01); *F23L 2900/07006* (2013.01); *F23N 2037/28* (2013.01); *F23N 2041/20* (2013.01); *F23R 2900/03282* (2013.01); *Y02E 20/16* (2013.01); *Y02E 20/322* (2013.01); *Y02E 20/328* (2013.01); *Y02E 20/344* (2013.01)

(58) Field of Classification Search
  CPC ........ F23N 5/00; F23N 5/003; F23N 2041/20; F23R 3/26; F23R 3/346
  USPC ........ 431/12, 13, 89, 354; 60/39.1; 110/188, 110/186
  See application file for complete search history.

(56) References Cited

U.S. PATENT DOCUMENTS

| | | |
|---|---|---|
| 3,561,895 A | 2/1971 | Michelson |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,568,266 A * | 2/1986 | Bonne ................... F23N 1/025 431/12 |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenbrger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |

(56) References Cited

U.S. PATENT DOCUMENTS

| | | |
|---|---|---|
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,746,187 A * | 5/1998 | Ninomiya ............ F02D 41/0032 123/520 |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Asen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon |
| 6,263,659 B1 | 7/2001 | Dillon |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,666 B1 * | 9/2001 | Ginter .................. F01D 25/285 60/39.55 |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Asen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Asen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Asen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |

(56) References Cited

U.S. PATENT DOCUMENTS

| | | |
|---|---|---|
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Fruschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 * | 9/2010 | Campbell ............... F02C 6/00 431/174 |

(56) References Cited

U.S. PATENT DOCUMENTS

| | | |
|---|---|---|
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,555,796 B2 | 10/2013 | D'Agostini |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0015061 A1 | 8/2001 | Viteri et al. |
| 2001/0029732 A1 | 10/2001 | Bachmann |
| 2001/0045090 A1 | 11/2001 | Gray, Jr. |
| 2002/0036086 A1 | 3/2002 | Minkkinen et al. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0166323 A1 | 11/2002 | Marin et al. |
| 2002/0187449 A1 | 12/2002 | Doebbeling et al. |
| 2003/0000436 A1 | 1/2003 | Havlena |
| 2003/0005698 A1 | 1/2003 | Keller |
| 2003/0014959 A1* | 1/2003 | Ginter .................. F01K 21/047 |
| | | 60/39.26 |
| 2003/0056517 A1 | 3/2003 | Brushwood et al. |
| 2003/0131582 A1 | 7/2003 | Anderson et al. |
| 2003/0134241 A1 | 7/2003 | Marin et al. |
| 2003/0221409 A1 | 12/2003 | McGowan |
| 2003/0235529 A1 | 12/2003 | Hershkowitz et al. |
| 2004/0006994 A1 | 1/2004 | Walsh et al. |
| 2004/0068981 A1 | 4/2004 | Siefker et al. |
| 2004/0128975 A1 | 7/2004 | Viteri |
| 2004/0148941 A1 | 8/2004 | Wylie |
| 2004/0154793 A1 | 8/2004 | Zapadinski |
| 2004/0166034 A1 | 8/2004 | Kaefer |
| 2004/0170558 A1 | 9/2004 | Hershkowitz |
| 2004/0170559 A1 | 9/2004 | Hershkowitz et al. |
| 2004/0175326 A1 | 9/2004 | Hershkowitz et al. |
| 2004/0180973 A1 | 9/2004 | Hershkowitz |

(56) References Cited

U.S. PATENT DOCUMENTS

| | | |
|---|---|---|
| 2004/0191166 A1 | 9/2004 | Hershkowitz et al. |
| 2004/0206091 A1 | 10/2004 | Yee et al. |
| 2004/0219079 A1 | 11/2004 | Hagen et al. |
| 2004/0223408 A1 | 11/2004 | Mathys et al. |
| 2004/0238654 A1 | 12/2004 | Hagen et al. |
| 2004/0241505 A1 | 12/2004 | Hershkowitz et al. |
| 2005/0022499 A1 | 2/2005 | Belokon et al. |
| 2005/0028529 A1 | 2/2005 | Bartlett et al. |
| 2005/0123874 A1 | 6/2005 | Abbasi et al. |
| 2005/0132713 A1* | 6/2005 | Neary .................. F02C 6/04 60/784 |
| 2005/0137269 A1 | 6/2005 | Hershkowitz et al. |
| 2005/0144961 A1 | 7/2005 | Colibaba-Evulet et al. |
| 2005/0154068 A1 | 7/2005 | Hershkowitz et al. |
| 2005/0186130 A1 | 8/2005 | Hughes et al. |
| 2005/0197267 A1 | 9/2005 | Zaki et al. |
| 2005/0201929 A1 | 9/2005 | Hershkowitz et al. |
| 2005/0229585 A1 | 10/2005 | Webster |
| 2005/0236602 A1 | 10/2005 | Viteri et al. |
| 2006/0005542 A1 | 1/2006 | Campbell et al. |
| 2006/0112675 A1 | 6/2006 | Anderson et al. |
| 2006/0112696 A1 | 6/2006 | Lynghjem et al. |
| 2006/0127827 A1 | 6/2006 | Yoshida et al. |
| 2006/0158961 A1 | 7/2006 | Ruscheweyh et al. |
| 2006/0183009 A1 | 8/2006 | Berlowitz et al. |
| 2006/0188760 A1 | 8/2006 | Hershkowitz et al. |
| 2006/0196190 A1* | 9/2006 | Arar .................. F23N 5/00 60/773 |
| 2006/0196812 A1 | 9/2006 | Beetge et al. |
| 2006/0231252 A1 | 10/2006 | Shaw et al. |
| 2006/0248888 A1 | 11/2006 | Geskes |
| 2006/0260290 A1 | 11/2006 | Rao |
| 2007/0000242 A1 | 1/2007 | Harmon et al. |
| 2007/0006565 A1 | 1/2007 | Fleischer et al. |
| 2007/0034171 A1 | 2/2007 | Griffin et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0125063 A1 | 6/2007 | Evulat |
| 2007/0130957 A1 | 6/2007 | Hoffmann et al. |
| 2007/0144747 A1 | 6/2007 | Steinberg |
| 2007/0144940 A1 | 6/2007 | Hershkowitz et al. |
| 2007/0178035 A1 | 8/2007 | White et al. |
| 2007/0220864 A1 | 9/2007 | Haugen |
| 2007/0227156 A1 | 10/2007 | Saito et al. |
| 2007/0231233 A1 | 10/2007 | Bose |
| 2007/0234702 A1 | 10/2007 | Hagen et al. |
| 2007/0237696 A1 | 10/2007 | Payton |
| 2007/0240425 A1 | 10/2007 | Malavasi et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2007/0295640 A1 | 12/2007 | Tan et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0016868 A1 | 1/2008 | Ochs et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0083226 A1 | 4/2008 | Joshi et al. |
| 2008/0092539 A1 | 4/2008 | Marshall et al. |
| 2008/0104938 A1 | 5/2008 | Finkenrath et al. |
| 2008/0104939 A1 | 5/2008 | Hoffmann et al. |
| 2008/0104958 A1 | 5/2008 | Finkenrath et al. |
| 2008/0115478 A1 | 5/2008 | Sullivan |
| 2008/0115495 A1 | 5/2008 | Rising |
| 2008/0118310 A1 | 5/2008 | Graham |
| 2008/0127632 A1 | 6/2008 | Finkenrath et al. |
| 2008/0141643 A1 | 6/2008 | Varatharajan et al. |
| 2008/0142409 A1 | 6/2008 | Sankaranarayanan et al. |
| 2008/0155984 A1 | 7/2008 | Liu et al. |
| 2008/0173584 A1 | 7/2008 | White et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0275278 A1 | 11/2008 | Clark |
| 2008/0290719 A1 | 11/2008 | Kaminsky et al. |
| 2008/0302107 A1 | 12/2008 | Fan et al. |
| 2008/0309087 A1 | 12/2008 | Evulet et al. |
| 2008/0317651 A1 | 12/2008 | Hooper et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0100754 A1 | 4/2009 | Gil |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0133400 A1 | 5/2009 | Callas |
| 2009/0145127 A1 | 6/2009 | Vollmer et al. |
| 2009/0157230 A1 | 6/2009 | Hibshman, II et al. |
| 2009/0193809 A1 | 8/2009 | Schroder et al. |
| 2009/0194280 A1 | 8/2009 | Gil et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0235671 A1 | 9/2009 | Rabovitser et al. |
| 2009/0241506 A1 | 10/2009 | Nilsson |
| 2009/0250264 A1 | 10/2009 | Dupriest |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2009/0319085 A1* | 12/2009 | Sell .................. F02D 41/1494 700/275 |
| 2010/0003123 A1 | 1/2010 | Smith |
| 2010/0018218 A1 | 1/2010 | Riley et al. |
| 2010/0028142 A1 | 2/2010 | Hashimoto et al. |
| 2010/0058732 A1 | 3/2010 | Kaufmann et al. |
| 2010/0064855 A1 | 3/2010 | Lanyi et al. |
| 2010/0077941 A1 | 4/2010 | D'Agostini |
| 2010/0077946 A1 | 4/2010 | D'Agostini |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0314136 A1 | 12/2010 | Zubrin et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0023488 A1 | 2/2011 | Fong et al. |
| 2011/0027018 A1 | 2/2011 | Baker et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ElKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ElKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |

(56) References Cited

U.S. PATENT DOCUMENTS

| | | |
|---|---|---|
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Millricker et al. |
| 2014/0000273 A1 | 1/2014 | Millricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |

FOREIGN PATENT DOCUMENTS

| | | |
|---|---|---|
| EP | 0770771 | 5/1997 |
| GB | 0776269 | 6/1957 |
| GB | 2117053 | 2/1983 |
| WO | WO99/06674 | 2/1999 |
| WO | WO99/63210 | 12/1999 |
| WO | WO2007/068682 | 6/2007 |
| WO | WO2008/142009 | 11/2008 |
| WO | WO2011/003606 | 1/2011 |
| WO | WO2012/003489 | 1/2012 |
| WO | WO2012/128928 | 9/2012 |
| WO | WO2012/128929 | 9/2012 |
| WO | WO2012/170114 | 12/2012 |
| WO | WO2013/147632 | 10/2013 |
| WO | WO2013/147633 | 10/2013 |
| WO | WO2013/155214 | 10/2013 |
| WO | WO2013/163045 | 10/2013 |
| WO | WO2013155214 | 10/2013 |
| WO | WO2013163045 | 10/2013 |
| WO | WO2014071118 | 5/2014 |
| WO | WO2014071215 | 5/2014 |

OTHER PUBLICATIONS

PCT/RU2013/000162, Feb. 28, 2013, General Electric Company.
U.S. Appl. No. 14/067,679, filed Oct. 30, 2013, Fadde et al.
U.S. Appl. No. 14/067,714, filed Oct. 30, 2013, Antoniono et al.
U.S. Appl. No. 14/067,726, filed Oct. 30, 2013, Antoniono et al.
U.S. Appl. No. 14/067,731, filed Oct. 30, 2013, Antoniono et al.
U.S. Appl. No. 14/067,739, filed Oct. 30, 2013, Antoniono et al.
U.S. Appl. No. 14/067,797, filed Oct. 31, 2013, Krull et al.
U.S. Appl. No. 14/135,055, filed Dec. 19, 2013, Biyani et al.
Ahmed, S. et al. (1998) "Catalytic Partial Oxidation Reforming of Hydrocarbon Fuels," *1998 Fuel Cell Seminar*, Nov. 16-19, 1998, 7 pgs.
Air Separation Technology Ion Transport Membrane—Air Products 2008.
Air Separation Technology Ion Transport Membrane—Air Products 2011.
Anderson, R. E. (2006) "Durability and Reliability Demonstration of a Near-Zero-Emission Gas-Fired Power Plant," *California Energy Comm.*, CEC 500-2006-074, 80 pgs.
Baxter, E. et al. (2003) "Fabricate and Test an Advanced Non-Polluting Turbine Drive Gas Generator," *US. Dept. of Energy, Nat'l Energy Tech. Lab.*, DE-FC26-00NT 40804, 51 pgs.
Bolland, O. et al. (1998) "Removal of CO2 From Gas Turbine Power Plants Evaluation of Pre- and Postcombustion Methods," *SINTEF Group*, 11 pgs. 1998, www.energy.sintef.no/publ/xergi/98/3/art-8engelsk.htm, 11 pgs.
BP Press Release (2006) "BP and Edison Mission Group Plan Major Hydrogen Power Project for California," Feb. 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," *KTH—Royal Institute of Technology, Dept. of Chemical Engineering and Technology*, 9 pgs.
Cho, J. H. et al. (2005) "Marrying LNG and Power Generation," *Energy Markets;* Oct./Nov. 2005; 10, 8; ABI/INFORM Trade & Industry, p. 28.
Ciulia, Vincent "Auto Repair. How the Engine Works," About.com. 2001-2003.
Clark, Hal (2002) "Development of a Unique Gas Generator for a Non-Polluting Power Plant," *California Energy Commission Feasibility Analysis*, P500-02-011F, Mar. 2002, 42 pgs.
Corti, A. et al. (1988) "Athabasca Mineable Oil Sands: The RTR/Gulf Extraction Process Theoretical Model of Bitumen Detachment," *4th UNITAR/UNDP Int'l Conf. on Heavy Crude and Tar Sands Proceedings*, v.5, paper No. 81, Edmonton, AB, Canada, Aug. 7-12, 1988, pp. 41-44.
Cryogenics. Science Clarified (2012) http://www.scienceclarified.com/Co-Di/Cryogenics.html.
Defrate, L. A. et al. (1959) "Optimum Design of Ejector Using Digital Computers" *Chem. Eng. Prog. Symp. Ser.*, 55 (21) pp. 46.
Ditaranto, M. et al. (2006) "Combustion Instabilities in Sudden Expansion Oxy-Fuel Flames," *ScienceDirect, Combustion and Flame*, v.146, Jun. 30, 2006, pp. 493-51.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara (2005) Licentiate Thesis, KTH—"Development of Methane Oxidation Catalysts for Different Gas Turbine Combustor Concepts." *The Royal Institute of Technology, Department of Chemical Engineering and Technology, Chemical Technology*, Stockholm Sweden, p. 22.
Ertesvag, I. S. et al. (2005) "Energy Analysis of a Gas-Turbine Combined-Cycle Power Plant With Precombustion $CO_2$ Capture," *Elsevier*, 2004, pp. 5-39.
Evulet, Andrei T. et al. (2009) "Application of Exhaust Gas Recirculation in a DLN F-Class Combustion System for Post Combustion Carbon Capture" *ASME J. Engineering for Gas Turbines and Power*, v131, May 2009.
Evulet, Andrei T. et al. (2009) "On the Performance and Operability of GE's Dry Low Nox Combustors utilizing Exhaust Gas Recirculation for Post-Combustion Carbon Capture" *Energy Procedia*, pp. 3809-3816.

(56) References Cited

OTHER PUBLICATIONS

Foy, Kirsten et al. (2005) "Comparison of Ion Transport Membranes"—*Fourth Annual Conference on Carbon Capture and Sequestration, DOE/NETL;* May 2005, 11 pages.
http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.
Luby, P. et al. (2003) "Zero Carbon Power Generation: IGCC as the Premium Option," *Powergen International,* 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen,* Aug. 3, 2007, 17 pgs.
Nanda, R. et al. (2007) "Utilizing Air Based Technologies as Heat Source for LNG Vaporization," presented at the 86$^{th}$ Annual convention of the *Gas Processors of America* (GPA 2007), Mar. 11-14, 2007, San Antonio, TX.
Reeves, S. R. (2001) "Geological Sequestration of $CO_2$ in Deep, Unmineable Coalbeds: An Integrated Research and Commercial-Scale Field Demonstration Project," *SPE 71749,* 10 pgs.
Reeves, S. R. (2003) "Enhanced Coalbed Methane Recovery," *SPE 101466-DL,* 8 pgs.
Richards, G. A. et al. (2001) "Advanced Steam Generators," *National Energy Tech. Laboratory,* 7 pgs.
Rosetta, M. J. et al. (2006) "Integrating Ambient Air Vaporization Technology with Waste Heat Recovery—A Fresh Approach to LNG Vaporization," presented at the 85$^{th}$ annual convention of the *Gas Processors of America* (GPA 2006), Grapevine, Texas, Mar. 5-8, 2006.
Snarheim, D. et al. (2006) "Control Design for a Gas Turbine Cycle With $CO_2$ Capture Capabilities," *Modeling, Identification and Control,* vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology,* 9 pgs.
vanHemert, P. et al. (2006) "Adsorption of Carbon Dioxide and a Hydrogen-Carbon Dioxide Mixture," *Intn '1 Coalbed Methane Symposium* (Tuscaloosa, AL) Paper 0615, 9 pgs.
Zhu, J. et al. (2002) "Recovery of Coalbed Methane by Gas Injection," *SPE 75255,* 15 pgs.
U.S. Appl. No. 13/596,684, filed Aug. 28, 2012, Slobodyanskiy, et al.
U.S. Appl. No. 14/066,579, filed Oct. 29, 2013, Huntington, et al.
U.S. Appl. No. 14/066,551, filed Oct. 29, 2013, Mi nto.
U.S. Appl. No. 14/144,511, filed Dec. 30, 2013, Thatcher et al .
U.S. Appl. No. 14/067,559, filed Oct. 30, 2013, Lucas, John Stoia et al.
PCT/RU13/000162, Feb. 28, 2013, General Electric Company.
U.S. Appl. No. 14/067,679, filed Oct. 30, 2013, Elizabeth Angelyn Fadde, et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, Apr. 10, 2013, General Electric Company/ExxonMobil Upstream Research Company.
U.S. Appl. No. 14/067,486, filed Oct. 30, 2013, Huntington, et al.
U.S. Appl. No. 14/067,537, filed Oct. 30, 2013, Huntington, et al.
U.S. Appl. No. 14/067,552, filed Oct. 30, 2013, Huntington, et al.
U.S. Appl. No. 14/067,563, filed Oct. 30, 2013, Huntington, et al.

\* cited by examiner

METHODS AND SYSTEMS FOR CONTROLLING THE PRODUCTS OF COMBUSTION

CROSS REFERENCE TO RELATED APPLICATIONS

This application is a Continuation of U.S. patent application Ser. No. 13/062,442 filed Mar. 4, 2011 entitled METHODS AND SYSTEMS FOR CONTROLLING THE PRODUCTS OF COMBUSTION, which is the National Phase application of PCT/US2009/055544 filed Aug. 31, 2009 entitled METHODS AND SYSTEMS FOR CONTROLLING THE PRODUCTS OF COMBUSTION, claims the benefit of U.S. Provisional Application No. 61/105,331 filed Oct. 14, 2008.

FIELD OF THE INVENTION

Embodiments of the invention relate to methods and systems for controlling the products of combustion. More particularly, methods and systems for obtaining substantially stoichiometric combustion in an oxy-fuel type combustion reaction are provided.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

Some approaches to lower $CO_2$ emissions include fuel de-carbonization or post-combustion capture. However, both of these solutions are expensive and reduce power generation efficiency, resulting in lower power production, increased fuel demand and increased cost of electricity to meet domestic power demand. Another approach is an oxy-fuel gas turbine in a combined cycle. However, there are no commercially available gas turbines that can operate in such a cycle.

The original oxy-fuel concept is based on the combustion of hydrocarbons with pure oxygen, which results in extremely high temperatures. Such high temperatures lead to problems in combustor life and also the development of Polycyclic Aromatic Hydrocarbons (PAHs), which lead to soot production. Numerous solutions to these issues have been attempted with varying levels of success, including using carbon dioxide as a mass flow gas through the turbine instead of air. However, this approach and others require specialized turbine equipment that is not yet commercially available.

U.S. Pat. No. 5,724,805 discloses a power plant having a gas turbine fueled by hydrocarbons mixed with an oxygen/carbon dioxide mixture. However, the disclosure states that the $O_2/CO_2$ mixture has more $O_2$ than air and therefore burns at very high temperatures requiring a large combustor chamber to allow time for the combustion gasses to gradually cool so less carbon monoxide (CO) is produced. As such, a specialized, non-standard combustor must be used for the techniques in the '805 reference to be practiced.

As such, there is still a substantial need for methods and systems to effectively control the temperature and composition of combustion product streams.

SUMMARY OF THE INVENTION

One embodiment of the present invention discloses a combustion control system. The combustion control system comprises a combustor consisting of at least a primary combustion zone and a burnout zone; a high concentration carbon dioxide ($CO_2$) supply (the diluent supply); an oxygen supply stream configured to combine with at least a first portion (the primary diluent flow) of the high concentration $CO_2$ stream to form an oxygenation stream substantially comprising oxygen and $CO_2$ and having an oxygen to $CO_2$ ratio; and a combustion fuel stream with a flow and a composition. The system further includes a combustor configured to mix and combust the oxygenation and combustion fuel streams within a primary combustion zone and a burnout zone in which a second part of the diluent supply (the secondary diluent) is added to form combustion products stream with a temperature and a composition; at least one temperature sensor configured to measure the temperature of the combustion products stream after the exit of the combustor, wherein the temperature of the combustion products stream is used to adjust the flow rate of the secondary diluent to obtain the desired temperature at the exist of the combustor; and at least one oxygen analyzer configured to measure the amount of oxygen in the composition of the combustion products stream, wherein the amount of oxygen in the combustion product is used to regulate the flow rate of the oxygen supply stream to achieve substantially stoichiometric combustion.

In some embodiments, the combustion fuel stream may be comprised of at least a high quality fuel gas stream, a low heating value fuel gas stream, and optionally, a high concentration $CO_2$ makeup stream. The separate streams may be operatively connected to a summation controller connected to the flow controllers for the individual streams to control the flow and composition of the combustion fuel stream to regulate the temperature of combustion and avoid flame burnout. In some embodiments, each of the streams may be operatively connected to a flow controller controlled by a central control system.

In additional embodiments, the combustor may include a first mix zone configured to mix the first portion of the high concentration $CO_2$ stream and the oxygen supply stream to form the oxygenation stream; a primary combustion zone configured to house the combustion reaction which produces the combustion products stream; and a burnout zone configured to deliver the second portion of the high concentration $CO_2$ stream to the combustor to regulate the temperature of the combustor and the combustion products stream. In one exemplary embodiment, a catalyst is added to the initial high temperature combustion zone to catalyze the combustion reaction. In another alternative embodiment, the second mix zone may be configured to pre-mix the oxygenation and combustion fuel streams or concurrently mix the streams with the combustion reaction.

Another embodiment of the present invention discloses a combustion control method. The method comprising providing a high concentration $CO_2$ stream, an oxygen supply stream, and a combustion fuel stream, wherein each stream has a flow rate and a composition; combining at least a first portion of the high concentration $CO_2$ stream and oxygen supply stream to form an oxygenation stream; combusting the oxygenation stream and the combustion fuel stream in a combustor to form a combustion products stream with a temperature and a composition; sensing the oxygen content of the combustion products stream; and adjusting the flow rate of the oxygen supply stream until the combustion products stream is substantially stoichiometric.

In a third embodiment of the present invention, a combustion system is provided. The combustion system includes a combustion fuel stream comprising substantially hydrocarbons and carbon dioxide ($CO_2$) and having an initial fuel to $CO_2$ ratio; an oxygenation stream comprising substantially oxygen and carbon dioxide ($CO_2$), wherein the combustion fuel stream and the oxygenation stream are combined to form the combustion reactants stream having a combined fuel to oxygen ratio regulated to meet a desired equivalence ratio (defined as the ratio of the actual fuel-to-oxidizer ratio to the stoichiometric fuel-to-oxidizer ratio) and a combined initial $CO_2$ to fuel ratio regulated to provide a desired combustion temperature within the primary combustion zone; a secondary diluent comprising substantially carbon dioxide ($CO_2$); and a combustor configured to combust the combustor inlet stream to produce the primary combustion product comprising substantially water and carbon dioxide, wherein the primary combustion product is mixed with the secondary diluent to form a combustion products stream having a temperature and a final $CO_2$ to fuel ratio.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION

Figure 1A:
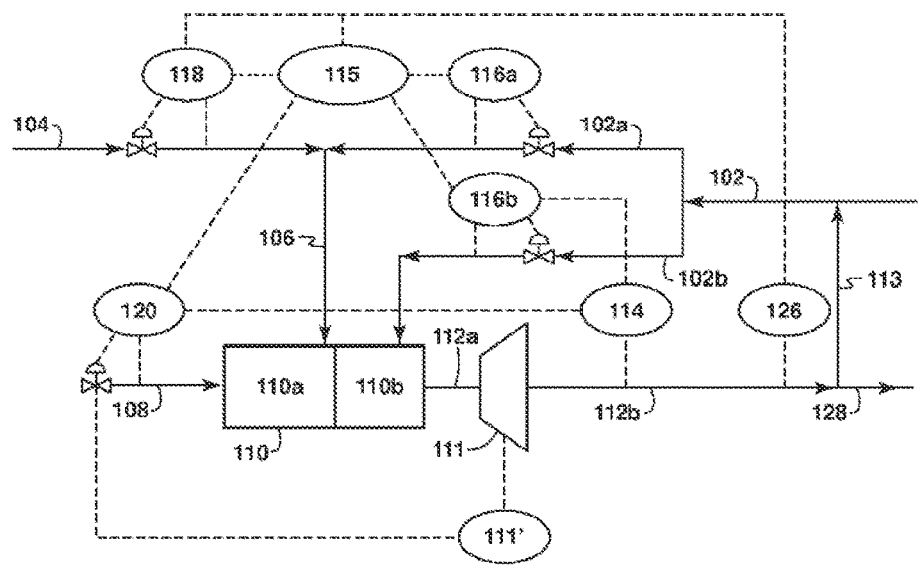
FIGS. 1A-1E illustrate four alternative exemplary control schematics in accordance with certain aspects of the present invention.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The term "stoichiometric combustion," as used herein, refers to a combustion reaction having a volume of hydrocarbons (e.g. fuel) and a volume of oxygen, where the volume of oxygen is just enough to combust or burn all or nearly all of the volume of hydrocarbons to produce a volume of combustion products having almost no oxygen remaining and almost no hydrocarbons remaining.

The term "primary residence time," as used herein, is the time required in a combustor to produce a combustion products stream at about equilibrium conditions at the local conditions of pressure and temperature.

Embodiments of the present disclosure provide combustion processes and systems designed for oxy-fuel combustion in a gas turbine. Preferred embodiments of the invention address problems associated with high temperature oxy-fuel combustion, such as the development of Polycyclic Aromatic Hydrocarbons (PAH's), which lead to soot production and production of problematic combustion products such as oxygen and carbon monoxide (or similar products of incomplete combustion). One exemplary embodiment of the combustion system design includes a high concentration carbon dioxide ($CO_2$) stream that is divided into at least a primary diluent and secondary diluent and an oxygen supply stream configured to combine with the primary diluent to produce an oxygenation stream substantially comprising oxygen ($O_2$) and carbon dioxide ($CO_2$) (e.g. "synthetic air"). The system further includes a combustion fuel stream and a combustor, wherein the combustor, which consists of at least a primary combustion zone and a burnout zone, is configured to mix and combust the combustion fuel stream and the oxygenation streams in a substantially stoichiometric combustion reaction to form a primary combustion products stream substantially comprising water (steam) and $CO_2$. In addition, the primary combustion product stream may be diluted with the secondary diluent to form a secondary combustion product stream.

Note, that in some embodiments, a high pressure combustion (e.g. greater than about 10 atmospheres) process may be utilized. The adiabatic flame temperature in the primary combustion zone can be controlled by varying the ratio of $CO_2$ mixed with the oxygen when forming the oxygenation stream. The temperature of the combustion products stream may be controlled independently to obtain the desired temperature or other properties of the combustion products at the exit of the combustor. As such, in some embodiments, the system will include a temperature sensor for measuring the combustion products stream and the percentage amount of $CO_2$ in the combustion products stream may be increased to decrease the temperature of the combustion products stream or decreased to increase the temperature.

In some embodiments of the present invention, $CO_2$ and oxygen are mixed to make a "synthetic air" (e.g. an oxygenation stream). The amount of $CO_2$ mixed with the oxygen provides a way to control the temperature of the primary combustion product stream and also another variable to help control the composition of the products of the combustion. The combustor design may include quench ports to provide additional $CO_2$ to the burnout zone to prevent the high temperatures of combustion from impinging on the combustor can. Additional embodiments of the system include a control system that measures the amount of hydrocarbon going to the combustor and calculates and controls the correct amount of oxygen needed for the combustion. The control system will also utilize feedback from instrumentation on the products of combustion to update the oxygen supply stream flow controller to ensure the desired combustion is achieved to provide the correct amount of oxygen to the oxygenation stream. A catalytic post combustion step is also optionally provided, which may be required depending on the hydrocarbon mixture that is used for the combustor. This catalytic step will reduce the oxygen in the primary combustion products stream down to the low levels required to avoid serious corrosion problems in the enhanced oil recovery (EOR) facilities.

Some embodiments of the present invention include methods of operating an oxy-fuel combustion system to provide the benefits and advantages of the disclosed systems. For example, one embodiment includes combining the combustion fuel stream with the oxygenation stream and combusting these streams in a combustor to form the combustion products stream. The combustion fuel and oxygenation streams may be pre-mixed or concurrently combined and combusted and may include a catalyst in some embodiments, depending on the composition and rates of the various streams. The method further includes sensing or detecting the temperature and/or composition of the combustion product stream and adjusting the flow rate of at least one of the combustion fuel and oxygenation streams until the combustion is at substantially stoichiometric conditions.

The methods and systems of the present disclosure may be utilized in a variety of applications, including a combustion gas turbine burner system. The gas turbine may be an integrated turbine operating on a single shaft, a multiple-shaft system, or a non-integrated system with an external burner, and may even be utilized with an independent compressor and hot gas expander, depending on the temperatures, volumes, and other variables of the particular system. The methods and systems may be utilized to beneficially increase combustion efficiency (e.g. reduce the amount of unburned or partially combusted fuel and/or oxygen) and provide greater control of turbine inlet temperature across a range of load conditions.

At least one benefit of the disclosed systems and methods includes the flexibility to use a commercial gas turbine combustion can type system with an oxy-fuel/co-generation type of system, such as the ultra-low emission power generation systems and processes disclosed in US2011/0000221. By controlling the amount of $CO_2$ mixed with the oxygen to form the oxygenation stream, the temperature and composition of the primary combustion products stream can also be controlled. Application of the disclosed systems and methods may avoid the need to develop a new combustor can for a gas turbine, permitting the use of "off-the-shelf" gas turbine combustor technology in such a system.

The combustor utilized could be similar to those used in the gasification process where oxygen and hydrocarbons react in a reducing atmosphere using steam to moderate the temperature. In the present invention, $CO_2$ would be used in place of the steam to moderate the temperature. Using steam is expensive and would also result in the formation of additional hydrogen in the products of combustion which is not desired in the present cycle. By mixing the $CO_2$ with the oxygen, it may also be possible to use a more conventional diffusion type combustor similar to those used in existing gas turbines where $CO_2$ would be used instead of air to cool the combustion liners. Combustion at near stoichiometric conditions is preferred to eliminate the cost of excess oxygen removal.

Embodiments of the present invention provide additional benefits. The present systems and methods enable an operator or automated system to control the temperature of the primary combustion zone separately from the temperature of the combustion product stream and control the products of combustion, such as limiting the amount of corrosive carbon monoxide and oxygen in the combustion product, therefore enabling the use of the combustion product in enhanced oil recovery (EOR) operations, which require the elimination of such corrosive components. Additionally, the disclosed systems and methods can adapt to changes in the quality of available fuel gas. For example, if a low heating value (e.g. less than 40 percent (%) methane) fuel gas is provided, such as from a low quality gas reservoir or a reservoir after $CO_2$ breakthrough, the systems and methods can adjust the ratio of oxygen in the oxygenation stream and/or add or increase the amount of high quality fuel gas or spiking fuel gas (e.g. hydrogen gas) to the combustion process to maintain the proper temperature and composition in the combustion products stream.

Referring now to the figures, FIGS. 1A-1D illustrate four alternative exemplary control schematics in accordance with certain aspects of the present invention. In particular, FIG. 1A is a basic exemplary system. The system 100 includes a high concentration carbon dioxide ($CO_2$) stream 102 that may be split into at least a primary diluent stream 102a and a second diluent stream 102b, and an oxygen supply stream 104, which may be combined with the primary diluent stream 102 a to form an oxygenation stream 106 having an oxygen to $CO_2$ ratio. A combustion fuel stream 108 is also provided, which may be comprised substantially of methane ($CH_4$) or may include a mixture of light hydrocarbons, heavier hydrocarbons, hydrogen ($H_2$), and inert gasses, such as carbon dioxide, depending on the source. A combustor (e.g. combustor can) 110 is also provided, which in the preferred embodiment is divided into two parts, a primary combustion zone 110a and a burnout zone 110b, and which is configured to receive at least the oxygenation stream 106 and the combustion fuel stream 108, mix and combust the oxygenation and combustion fuel streams 106 and 108 in the primary combustion zone 110a at a desired flame temperature and primary residence time inside the combustor sufficient to produce a hot products stream (not shown) near equilibrium conditions and then dilute the hot products stream with the secondary diluent within the burnout zone 110b to form the combustion products stream 112a, which may be fed into an expansion device 111 (e.g. a gas turbine or hot gas expander), which is operatively connected to a load controller 111' to form an expanded products stream 112b. The expanded products stream 112b may be split to form stream 113, which may form at least a portion of the high concentration $CO_2$ stream 102 and a secondary stream 128, which may be utilized for enhanced oil recovery (EOR), sequestration, or another purpose. The system 100 further includes at least one of a temperature sensor 114 and an oxygen analyzer 126 configured to measure the temperature and oxygen content, respectively, of the combustion products stream 112a or the expanded products stream 112b. Temperature data from the temperature sensor 114 is used to control the flow rate of the secondary diluent stream 102b and to regulate the temperature of the combustion products stream 112a. The flow rate of the oxygen supply 104 is adjusted in proportion to the flow rate of the combustion fuel supply 108. Oxygen data from the oxygen analyzer 126 is used to adjust the proportioning factor of the flow rate of the oxygen supply stream 104 to the combustion fuel supply 108 until a substantially stoichiometric combustion is achieved.

Still referring to FIG. 1, the system 100 further includes a central controller 115 operatively connected to a first flow controller 116a for controlling the primary diluent 102a; a second flow controller 118 for controlling the oxygen supply 104; a third flow controller 120 for controlling the combustion fuel stream 108; and a fourth flow controller 116b for controlling the secondary diluent stream 102b. The central controller 115 may also be connected to the temperature sensor 114 and the oxygen sensor 126 to determine the amount of unburned oxygen in the combustion products stream 112a or the expanded products stream 112b and use those measurements to control the flow of the oxygen supply stream 104. The central controller 115 may also control the flow rate of the combustion fuel stream 108 and the oxygen supply stream 104 to maintain desired stoichiometry as the load condition changes.

The high concentration carbon dioxide ($CO_2$) stream (or "diluent supply stream") 102 may come from any convenient source. For example, at least a portion of the diluent supply stream 102 may be derived from diverting or splitting at least a portion of the expanded products stream 112b via recycle stream 113. However, the system 100 may be located near another source of high concentration $CO_2$, such as an external pipeline network, a high $CO_2$ gas well, a gas treatment plant, or other source. In addition, recycle stream 113 may include some treatment, such as a filtering system like a membrane, mole sieve, absorption, adsorption, or other system to remove potentially dangerous or undesirable components, such as un-reacted oxygen or hydrocarbons. In particular, if the oxygen analyzer determines that the expanded products stream 112b has high levels of oxygen, then the expanded products stream 112b should not be used as a diluent, like in the secondary diluent stream 102b. Similarly, high levels of unreacted hydrocarbons may also be unacceptable, depending on the combustor 110 and may need to be removed or separated before use as a secondary diluent stream 102b. However, it is preferred and intended that the combustion product stream 112a has undergone a substantially stoichiometric combustion, so it should have less than about 3.0 volume percent (vol %) oxygen, or less than about 1.0 vol % oxygen, or less than about 0.1 vol % oxygen, or even less than about 0.001 vol % oxygen and less than about 3.0 volume percent (vol %) hydrocarbons, or less than about 1.0 vol % hydrocarbons, or less than about 0.1 vol % hydrocarbons, or even less than about 0.001 vol % hydrocarbons.

The secondary stream (or "remainder stream") 128 may be used for sales, used in another process requiring high concentration carbon dioxide, or compressed and injected into a terrestrial reservoir for enhanced oil recovery (EOR), sequestration, or another purpose. Like with recycle stream 113, stream 128 may need to undergo some conditioning before use to remove potential contaminants or reactants like nitrogen oxides (NOx) or oxygen. Again, it is preferred and intended that stream 104 includes substantially no nitrogen, and that stream 112a has undergone a substantially stoichiometric combustion, so it should have less than about 3.0 volume percent (vol %) oxygen, or less than about 1.0 vol % oxygen, or less than about 0.1 vol % oxygen, or even less than about 0.001 vol % oxygen and less than about 3.0 volume percent (vol %) NOx, or less than about 1.0 vol % NOx, or less than about 0.1 vol % NOx, or even less than about 0.001 vol % NOx.

The oxygen supply stream 104 may be provided by an air separation unit (ASU) or other process or system providing high purity oxygen. The separated nitrogen may be used in another related process, such as in a nitrogen injection well as disclosed in US2011/0000221. In one exemplary embodiment, the oxygen supply stream 104 may include from about 90 vol % to about 99.9 vol % oxygen with the remainder argon and may include trace amounts of nitrogen and carbon dioxide. In another exemplary embodiment, the oxygen supply stream may include from about 95 vol % to about 96 vol % oxygen with about 4 vol % to about 5 vol % argon and less than about 0.2 vol % carbon dioxide.

The central controller 115 may be any type of control system configured to receive data inputs, such as flow rates and compositions, and send signals to control flow rates via, for example, valves, pumps, compressors, and any other device that may be used to adjust a flow rate. In one exemplary embodiment, the central controller 115 may include a programmable computer having user input devices such as a keyboard and mouse, user output devices such as a monitor and speakers, and may operate using active memory (RAM), and be operably connected to hard disk drives, optical drives, network drives, and databases via a LAN, WAN, Wi-Fi, or other external network.

The flow controllers 116a, 116b, 118, and 120 may include programmable automated controllers for receiving and processing signals from the central controller 115, and may be operably connected to flow valves or vanes, vents, or other means of increasing or decreasing the flow of a substantially gaseous stream. Additionally, in one exemplary embodiment, the flow controllers 116a, 116b, 118, and 120 may be operably connected to flow and/or composition sensors, which may provide additional data input, such as to verify changes in the flow rates of the respective streams controlled by the flow controllers. In order to maintain flame stability and effective control, it may be beneficial to utilize a high speed controller for any or all of the controllers 116a, 116b, 118, and 120.

Although flow controller 116b may be an active sensor as described above, the flow rate of the secondary diluent stream 102b may be uncontrolled in one exemplary embodiment. For example, the combustor 110 may include a liner having one or more quench ports (e.g. dilution holes) with a particular pattern and hold size designed to provide dilution and control temperatures in the combustor 110. Hence, the flow rate of the secondary diluent stream 102b may be primarily dependent upon the hardware design of the quench ports in the combustor 110 and the pressure, temperature and composition of diluent supply stream 102. Additionally, the flow controller 116b may still be useful for shutting off the flow of secondary diluent 102b in case of shut down, contamination of the secondary diluent 102b, or some other reason. In some embodiments, the central controller 115 may further include two out of three voting for certain sensors, such as the temperature sensor 114 and the oxygen analyzer 126. The control system, including the central controller 115 may also be configured with at least one safety interlock and/or shutdown logic and an alarm if the system 100 gets out of control to protect the downstream machinery.

The temperature sensor 114 may be a single sensor or may additionally include a backup sensor for redundancy or an array of sensors in and around the combustion products stream 112a or the expanded products stream 112b to ensure accurate temperature readings. Any type of appropriate temperature sensor may be used, although the sensor chosen should have a high resistance to heat and be able to effectively operate at temperatures at or above about 2,000 degrees Fahrenheit (° F.) or even above about 2,200° F. In some exemplary embodiments of the described inventive system 100, the temperature sensor 114 may send data directly to the $CO_2$ flow controller 116b, or may send data to the central controller 115, which then controls the response of the flow controller 120. Alternatively, the temperature sensor 114 may also send data directly to the combustion fuel stream flow controller 120. Additionally and alternatively, the temperature sensor 114 may take data from inside the combustor 110 near the exhaust or downstream of the burnout zone 110b after exiting, at multiple locations along the combustion products stream 112a and expanded products stream 112b, or some combination thereof. The temperature of the streams 112a and 112b should be limited to within certain operating parameters, which will depend highly on the equipment in use, the type of combustion fuel stream and other input streams available, the potential uses for the remainder stream 128, and other factors.

Generally, the temperature in the primary combustion zone 110a should be below about 3,500° F. to avoid NOx production and because most commercial combustors 110 cannot operate above such temperatures, but this limitation may be set higher if the material of the combustor 110 can operate at higher temperatures and there is no nitrogen in the system 100. The temperature is preferably less than about 2,500° F. at the inlet of the expander 111. Such high temperatures also contribute to the formation of undesirable Polycyclic Aromatic Hydrocarbons (PAH's), which lead to soot production. However, the temperature in the primary combustion zone 110a must be sufficiently high to avoid flame burnout, which is done by regulating the oxygen to $CO_2$ ratio based on the temperature of the reactants entering the primary combustion zone and the heat release available from the specific fuel 108 and sufficiently high to effectively combust substantially all of the oxygen ($O_2$) and hydrocarbons (e.g. stoichiometric combustion temperature) to produce the expanded products stream 112b requiring only limited conditioning before use in enhanced oil recovery (EOR) or as a diluent in the system 100. For many cases, the preferred temperature of the combustion product stream 112a will be from at least about 1,500° F. to at most about 2,500° F. or from at least about 1,600° F. to at most about 1,900° F. For many cases, the preferred adiabatic flame temperature within the primary combustion zone will be from at least 2,450° F. to at most 3,500° F. unless improved materials of construction and no nitrogen is present in the combustion reactants in which case the upper limit may be increased.

The oxygen analyzer 126 may be a single sensor, may include additional sensors for redundancy, or an array of sensors at multiple locations to ensure accurate measurements. For example, a plurality of lambda or wideband zirconia $O_2$ sensor may be used to provide feedback to one of the central controller 115 and/or the oxygen supply stream flow controller 118. If the lambda sensor is used, the central controller 115 may be configured to dither the ratio of the fuel in the combustion fuel stream 108 to the oxygen in the oxygen supply stream 104 as the oxygen content of the combustion products stream 112 a varies from a stoichiometric coefficient below 1.0 to above 1.0. The dithering process is similar to those used in the automotive industry for internal combustion engines. In any case, the oxygen content of the combustion products stream is preferably low, from less than about 3.0 volume percent (vol %) to less than about 1.0 vol % to less than about 0.1 vol % to less than about 0.001 vol %. If the amount of oxygen is too high, then the flow rate of the oxygen supply stream 104 is reduced. In turn, this may lower the flame temperature, as discussed above, requiring an adjustment of the flow of the combustion fuel stream 108.

Figure 1B:
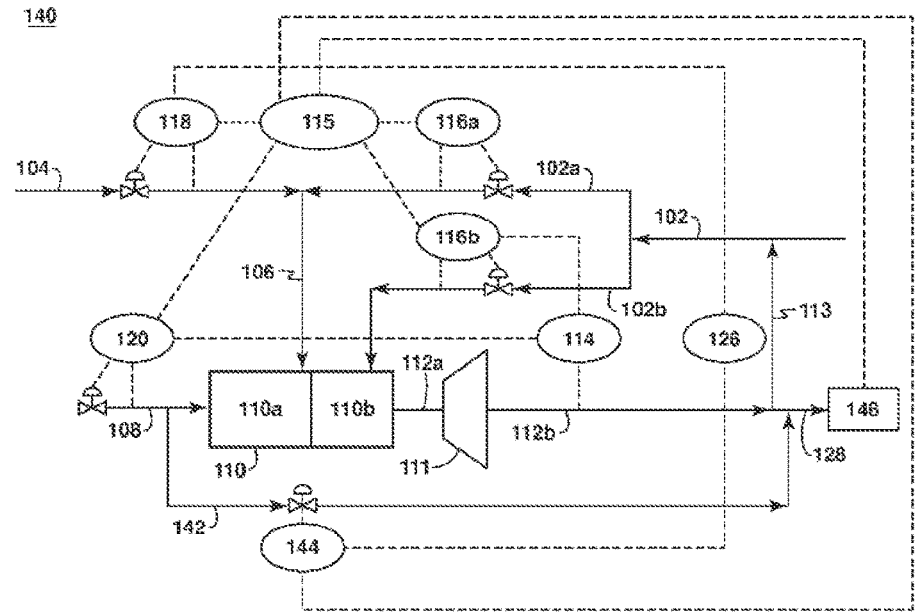

FIG. 1B illustrates the basic exemplary system as shown in FIG. 1A, but with additional, optional features configured to further treat or condition the products streams 112a and 112b. As such, FIG. 1B may be best understood with reference to FIG. 1A. The system 140 includes all of the features disclosed with respect to FIG. 1A, but further includes a post-combustion catalysis apparatus 146 configured to reduce the oxygen and carbon monoxide content in the products streams 112a and 112b and a combustion fuel bypass stream 142 with a flow and a composition and having a flow controller 144 for controlling the flow rate of the combustion fuel bypass stream 142. The oxygen analyzer 126 may be operatively connected to the flow controller 144 directly or indirectly via the central controller 115. Additional flow controllers and oxygen analyzers (not shown) may be required in certain specific embodiments where the combustion fuel bypass stream 142 is split or stream 128 is looped, as discussed further below.

The catalysis apparatus 146 may be a single device or a plurality of devices in parallel or series, but is preferably a small device requiring only a small amount of power to operate. In particular, the catalysis apparatus 146 may be a carbon monoxide reduction catalyst and/or an oxygen reduction catalyst that is normally used in Heat Recovery Steam Generators (HRSG's) to meet emissions requirements. Such a system is generally not designed to remove large amounts of oxygen, but if significant amounts of oxygen remain in the expanded products stream 112b, the expanded product stream 112b may need to recycle through the catalysis apparatus 146 more than once before it is compressed and injected for enhanced oil recovery (EOR). As such, in some embodiments, another oxygen analyzer (not shown) may be needed after the catalysis apparatus 146 to ensure that the injection stream 128 is sufficiently low in oxygen (e.g. less than about 0.5 volume percent (vol %) oxygen or less than about 0.1 vol %) to avoid corrosion of the compression and injection equipment and avoid souring the reservoir by injecting oxygen that can react with the hydrocarbons remaining in the reservoir.

The combustion fuel bypass stream (e.g. second portion of the combustion fuel stream) 142 is configured to be combined with the expanded products stream 112b downstream from where recycle flow stream 113 is divided from the expanded product stream 112b, and is preferably introduced upstream from the catalysis apparatus 146 so that the additional hydrocarbons may be used in the catalysis apparatus 146 to improve oxygen removal efficiency. However, in some alternative embodiments, the bypass stream 142 may be split and introduced before and after the catalysis apparatus 146. In the embodiment where the EOR stream 128 is looped back to the catalysis apparatus 146, it may be beneficial to introduce a portion of the bypass stream 142 into the EOR stream 128 before looping it back to the catalysis apparatus 146. Beneficially, the bypass stream 142 is configured to reduce the volume percent of oxygen in the EOR stream 128 before compression and injection into a reservoir to substantially avoid corrosion of injection and compression equipment and souring the hydrocarbons remaining in the injection reservoir.

Figure 1C:
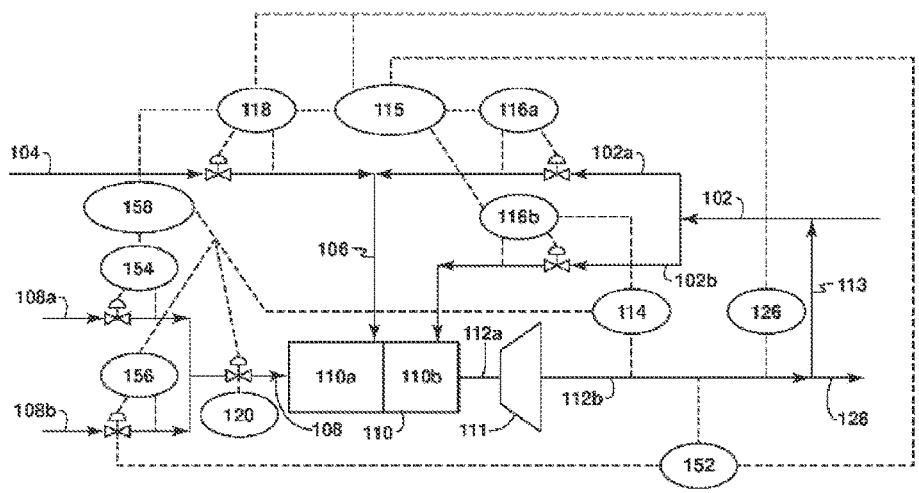

FIG. 1C is an illustration of a third exemplary embodiment of the system of FIG. 1A, which may or may not include the features disclosed in the illustration of the embodiment of FIG. 1B. As such, FIG. 1C may be best understood with reference to FIGS. 1A and 1B. The system 150 includes a hydrocarbon analyzer 152 configured to measure the amount of hydrocarbons in the composition of the products streams 112a and/or 112b, a high quality fuel gas supply 108a controlled by a flow controller 154, and a low heating value fuel gas supply 108b controlled by a flow controller 156. Flow controller 156 may be directly connected to the hydrocarbon analyzer 152 and/or may be connected via central controller 115. The flow controllers 154, 156, and optionally 120 may be operatively connected to a summation controller 158, which may be connected to the central controller 115 directly or via oxygen supply controller 118.

The high quality fuel gas stream 108a may be comprised of substantially pure methane (e.g. about 99 vol %) and alternatively may comprise a "spiking" fuel gas such as hydrogen, higher hydrocarbons ($C_3$+) or any combination thereof. The composition of the high quality fuel gas stream 108a will primarily vary depending on the needs of the system 150 and the availability of various fuel types, but preferably will not include significant quantities of inert gases (e.g. nitrogen, carbon dioxide, etc.) or acid gases (e.g. sulfur dioxide, hydrogen sulfide, etc.). High quality fuel gas stream 108a may be from any reasonable source, but is preferably available from a nearby gas production field rather than imported from a significant distance. Specifically, if the stream 108a is hydrogen, it may be provided from an auto-thermal reforming (ATR) process performed on a gas production stream from a nearby production gas field (not shown).

The low heating value fuel gas stream 108b may be comprised of less than about 80 vol % methane, less than about 60 vol % methane, less than about 40 vol % methane, or even less than about 20 vol % methane. The low heating value stream 108b may also include small amounts of heavier hydrocarbons such as ethane and propane. In most cases, the majority of the remainder of the stream 108b will be inert gases such as carbon dioxide, but in some cases, there will be small amounts of nitrogen, hydrogen sulfide, helium, and other gases. Preferably, all non-hydrocarbons and all inert gases other than carbon dioxide will be separated out of the stream 108b prior to mixing and combustion.

In one exemplary embodiment, the flow and composition of the two hydrocarbon containing streams 108a and 108b are used to calculate the oxygen requirement to operate the combustor 110 and provide the set point for the oxygen supply flow controller 118. The calculation will provide the amount of oxygen needed for a stoichiometric combustion in the combustor 110. The flows and compositions of the streams may change over the life of the system 150, depending on the source of the streams 108a and 108b. For example, the low heating value fuel gas 108b may originate from an EOR well having a high methane content in early production (e.g. above about 80 vol %). In such a case, there may be little or no flow through the high quality fuel gas stream 108a. However, when breakthrough occurs, the flow from the low heating value fuel gas stream 108b may comprise very low methane content (e.g. less than about 20 vol %). In that case, the flow from the high quality fuel gas stream 108a is increased to add hydrocarbons to the combustion fuel stream 108.

Figure 1D:
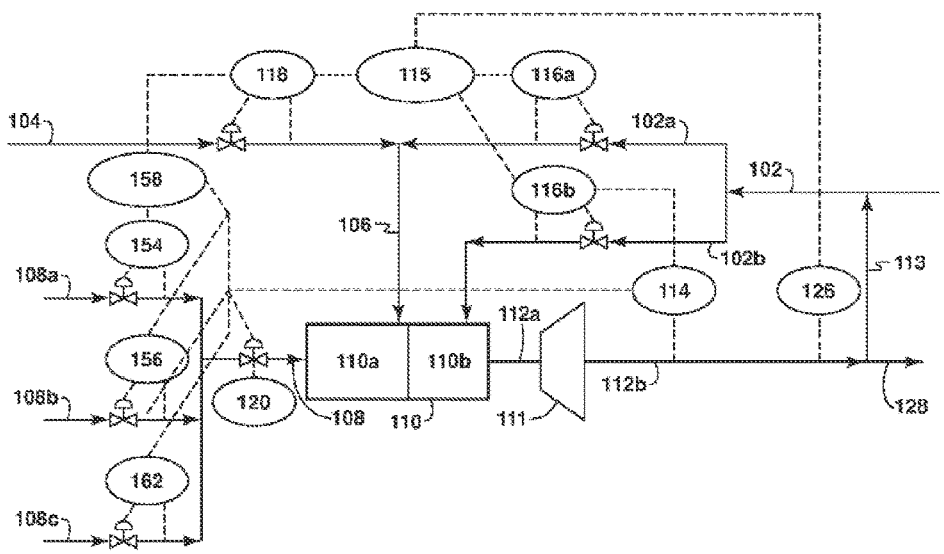

FIG. 1D is an illustration of a fourth exemplary embodiment of the system of FIG. 1A, which may or may not include the features disclosed in the illustration of the embodiment of FIGS. 1B and 1C. As such, FIG. 1D may be best understood with reference to FIGS. 1A-1C. The system 160 further includes a high concentration $CO_2$ makeup stream 108c with a flow and composition and a flow controller 162 operatively attached thereto.

The $CO_2$ makeup supply stream 108c may be combined with streams 108a and 108b to generate a combustion fuel gas stream 108 having a substantially constant composition over the life of the system 160. The approach is similar to the system 150, but the physical characteristics of the combustor could be designed specifically for the composition of 108 and still burn fuels that have variable composition 108b. The $CO_2$ stream 108c may be split from the expanded products stream 112b or originate from another source.

Figure 1E:
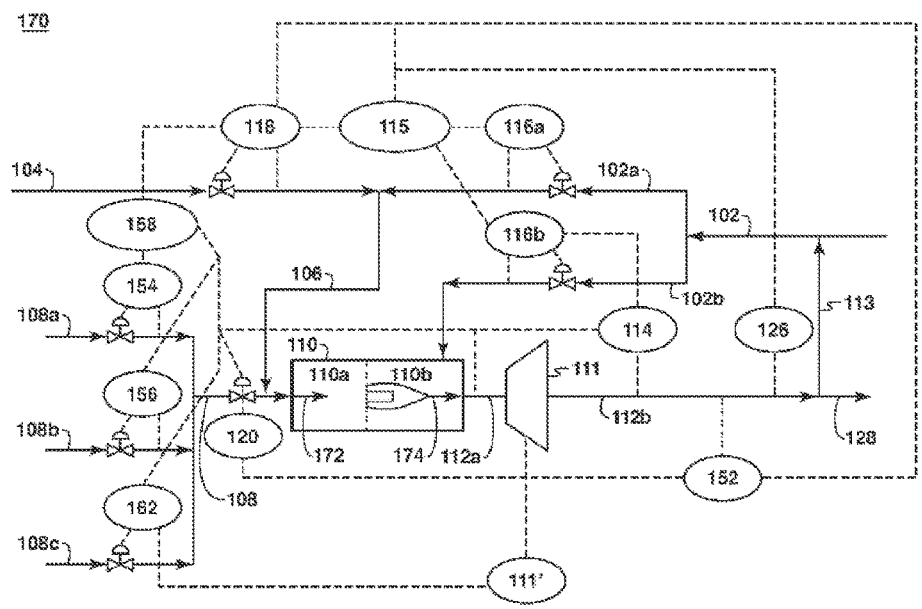

FIG. 1E is an illustration of a fourth exemplary embodiment of the system of FIGS. 1A-1D. As such, FIG. 1E may be best understood with reference to FIGS. 1A-1D. The system 170 includes a combustion fuel stream 108 comprising substantially hydrocarbons and carbon dioxide ($CO_2$) and having an initial fuel to $CO_2$ ratio; an oxygenation stream 106 comprising substantially oxygen and carbon dioxide ($CO_2$), wherein the combustion fuel stream 108 and the oxygenation stream 106 are combined to form a combustor inlet stream 172 having a combined fuel to oxygen ratio configured to meet an optimal equivalence ratio and a combined initial $CO_2$ to fuel ratio configured to provide an optimal combustion temperature; a secondary diluent stream 102b; and a combustor 110 configured to combust the combustor inlet stream 172 to produce a hot products stream 174 comprising substantially water and carbon dioxide, wherein the hot products stream 174 is mixed with the secondary diluent stream 102b to form a combustion products stream 112a having a temperature and a final $CO_2$ to fuel ratio.

In some exemplary embodiments, the hydrocarbons in the combustion fuel stream 108 are comprised substantially of methane and the fuel to oxygen molar ratio is from about 1.9:1 mol fuel to mol oxygen to about 2.1:1 mol fuel to mol oxygen or from about 1.95:1 mol fuel to mol oxygen to about 2.05:1 mol fuel to mol oxygen. These molar ratios are approximately equivalent to stoichiometric ratios of 0.9:1 to about 1.1:1. In additional exemplary embodiments, the hydrocarbons in the combustion fuel stream 108 are comprised substantially of methane and the final $CO_2$ to fuel ratio is from about 10:1 mol $CO_2$ to mol fuel to about 30:1 mol $CO_2$ to mol fuel or from about 15:1 mol $CO_2$ to mol fuel to about 25:1 mol $CO_2$ to mol fuel or from about 20:1 mol $CO_2$ to mol fuel to about 23:1 mol $CO_2$ to mol fuel.

In at least one exemplary embodiment, the system 170 further includes a high quality fuel gas stream 108a with a flow and a composition; a low heating value fuel gas stream 108b with a flow and composition; and a high concentration $CO_2$ makeup stream 108c configured to combine with the high quality fuel gas stream 108a and the low heating value fuel gas stream 108b to form the combustion fuel stream 108 and maintain a constant initial fuel to $CO_2$ ratio of the combustion fuel stream 108. Additional embodiments may include an oxygen supply stream 104 with a flow and a composition; and a high concentration $CO_2$ mixing stream 102a with a flow and a composition configured to combine with the oxygen supply stream 104 to form the oxygenation stream 106.

In yet another exemplary embodiment, the system 170 additionally includes at least one temperature sensor 114 configured to measure the temperature of the combustion products stream 112a and/or expanded products stream 112b (and optionally the hot products stream 174) wherein the temperature of the streams 112a or 112b are used to calculate the flow rate of at least one of the high concentration $CO_2$ mixing stream 102a, the high concentration $CO_2$ makeup stream 108c, and the secondary diluent stream 102b, to regulate the temperature of combustion; at least one oxygen analyzer 126 configured to measure the amount of oxygen in the composition of the products streams 112a and/or 112b, wherein the amount of oxygen in the products streams 112a-112b is used to optimize the flow rate of the oxygen supply stream 104 to achieve substantially stoichiometric combustion; and at least one hydrocarbon analyzer 152 configured to measure the amount of hydrocarbons in the composition of the products streams 112a-112b, wherein the amount of hydrocarbons in the composition of the products streams 112a-112b is used to optimize the flow rate of the oxygen supply stream 104 to achieve substantially stoichiometric combustion. The system 170 may also include a gas turbine 111 having a load and a load controller 111' configured to measure the load, wherein the load measurement is used to maintain the combined fuel to oxygen ratio as the load changes.

Figure 2:
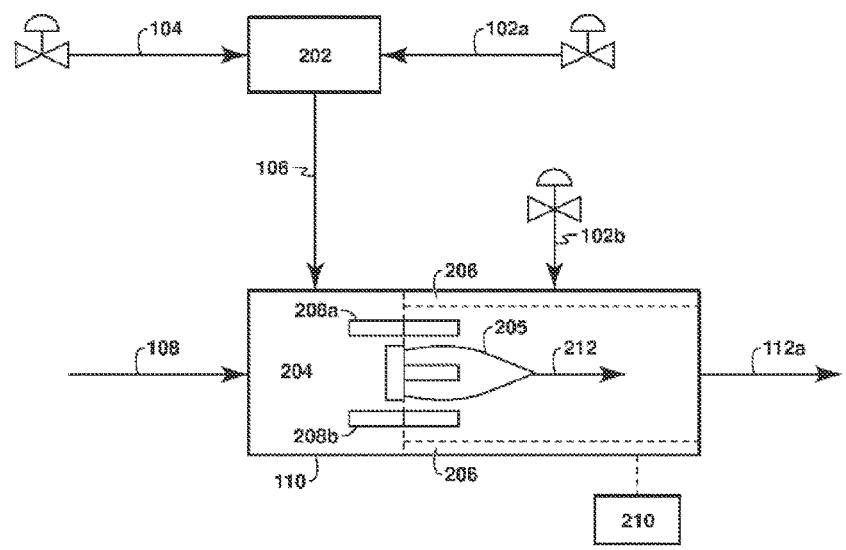
FIG. 2 illustrates a schematic of an exemplary combustor as it might be configured for use in the alternative exemplary systems of FIGS. 1A-1E.

FIG. 2 illustrates a schematic of an exemplary combustor as it might be configured for use in the alternative exemplary systems of FIGS. 1A-1D. As such, FIG. 2 may be best understood with reference to FIGS. 1A-1D. The combustor system 200 comprises a first mix zone 202, a second mix zone 204, an initial high temperature primary combustion zone 205, a burnout zone 206, and optional fuel injection nozzles 208a and 208b. The hot products stream (or "primary combustion products stream") 212 is produced from primary combustion zone 205. Note, that in some exemplary embodiments, a high pressure combustion process (e.g. greater than about 10 atmospheres) may be utilized.

The first mix zone 202 is configured to mix the primary diluent stream 102a with the oxygen supply stream 104 to form the oxygenation stream 106. The second mix zone 204 is configured to mix the oxygenation stream 106 and the combustion fuel stream 108. In one embodiment the streams 106 and 108 may be pre-mixed in the second mix zone 204 and then directly flow into the primary combustion zone 205. In another embodiment, which is referred to as non-premixed, the second mixing zone 204 and the primary combustion zone 205 overlap and occur concurrently, as in a diffusion burner type of arrangement. The primary combustion zone 205 includes a burner, a flame, and the combustion reaction itself, which produces the hot products stream 212. The burnout zone 206 delivers the secondary diluent stream 102b to the combustor 110 to regulate the temperature of the combustor 110 and the combustion products stream 112a.

In some exemplary embodiments of the combustor 110, the burnout zone 206 comprises one of a passive dilution zone having a series of holes configured to cool and quench the liner of the combustor 110; an active dilution zone having at least one quench port configured to actively deliver at least a portion of the secondary diluent stream 102b to the combustor 110 to mix with the primary combustion products stream 212; a series of staged quench ports to actively control a temperature pattern through the burnout zone 206; and any combination thereof. In addition, the burnout zone 206 may include a pressure transducer or other sensor 210 to monitor and measure pressure oscillations in the combustor 110, which are a sign of flame blowout. An oxygen analyzer (not shown) may also be included in the combustor 110 to provide another input to the oxygen feedback loop.

In one exemplary embodiment of the non-premixed arrangement, the combustion fuel streams 108a and 108b may be introduced in separate nozzles 208a and 208b that are configured based on the volume flow of the respective stream, or mixed and injected as a mixed combination of the combustion fuel stream 108 through a single injector.

The combination of the oxygenation stream 106 and the combustion fuel stream 108 in the combustor 110 is configured to maintain a minimum adiabatic flame temperature and flame stability to combust all or nearly all of the oxygen in the oxygenation stream 106 (e.g. a stoichiometric reaction is preferred). In terms of heating value, the oxygenation stream 106 has no heating value, the high quality fuel gas stream 108a may have a relatively high value (e.g. from at least 500 British thermal units per standard cubic foot (BTU/scf) to about 950 BTU/scf) and the low heating value fuel gas stream 108b has a relatively low heating value (e.g. from about 150 BTU/scf to about 450 BTU/scf).

The combustor 110 may be a standard external combustor or may be a customized or modified combustor. Examples of applicable combustor types include an oxyClaus burner, a partial oxidation (PDX) burner, auto-thermal reforming (ATR) burner, and gas turbine diffusion combustors. Note that each burner type may require some modification to work with a substantially $CO_2$ stream.

In one exemplary embodiment, the second mix zone 204 and nozzles 208a and 208b may be configured to mix the combustion fuel stream 108 and the oxygenation stream 106 in a highly turbulent manner to ensure a homogeneous mixture is achieved. During operation, the primary combustion zone 205 produces temperatures up to about 2,200° C. With the addition of the quench gas 102b, the combustion products stream 112a is expected to be up to about 1,400° C. as it enters the burnout zone 206. Additional quench gas 102b may be introduced via the outer wall of the burnout zone 206 generating a sort of "gas envelope" to keep the wall of the combustor 110 notably cooler than the flame 205. In one exemplary embodiment, the cooling stream 102b may be stripped of hydrocarbons to minimize soot formation, if necessary. In another exemplary embodiment, the combustion takes place at higher than atmospheric pressure, such as above about 10 atmospheres. The reaction generates water (vapor) and carbon dioxide as shown by the equations below (the carbon dioxide entering the chamber generally remains unreacted):

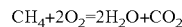

$$CH_4 + 2O_2 = 2H_2O + CO_2$$

Figure 3:
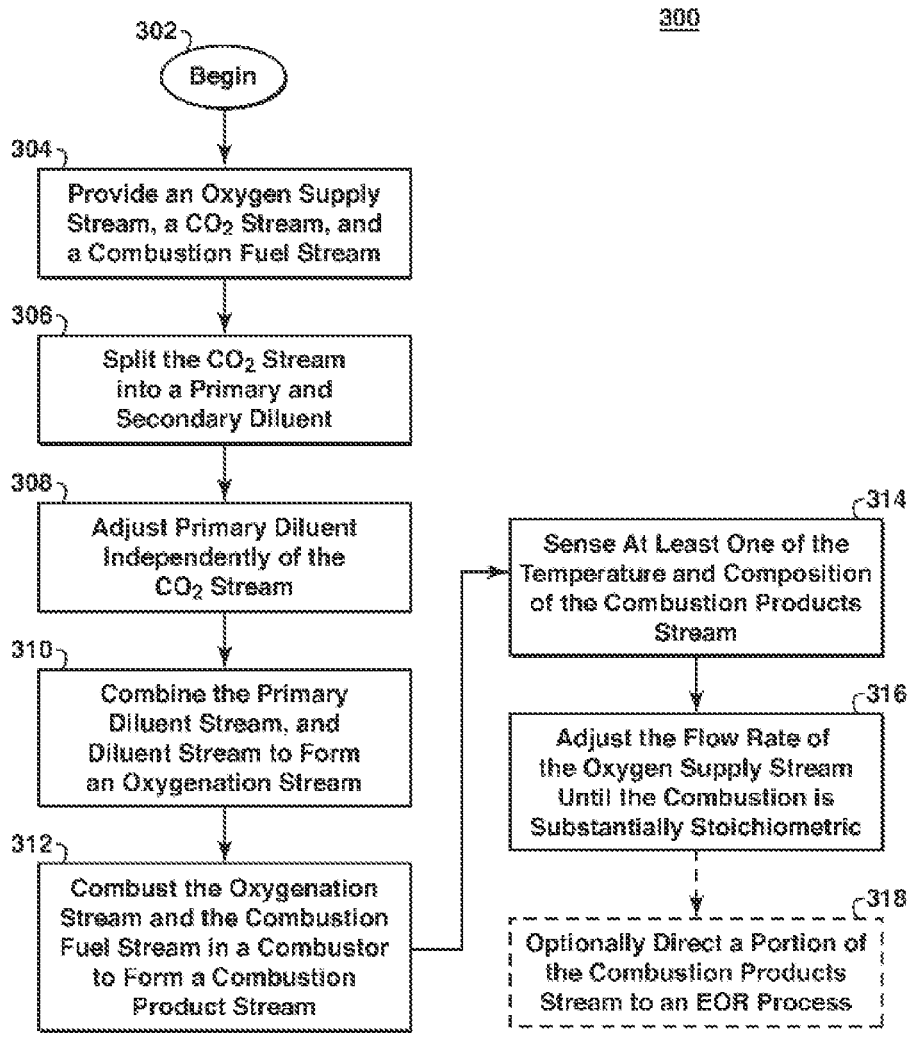
FIG. 3 is an exemplary flow chart of a method of operating the system of FIGS. 1A-1E.

FIG. 3 is an exemplary flow chart of a method of operating the system of FIGS. 1A-1D. As such, FIG. 3 may be best understood with reference to FIGS. 1A-1D. The method 300 begins at block 302, then includes providing 304 a high concentration $CO_2$ stream 102, an oxygen supply stream 104, and a combustion fuel stream 108, wherein each stream has a flow rate and a composition; splitting 306 the high concentration $CO_2$ stream 102 into a primary diluent stream 102a and a secondary diluent stream 102b, each having a flow rate; adjusting 308 the primary diluent stream flow rate independently of the overall flow rate of the high concentration $CO_2$ stream; combining 310 the primary diluent stream 102a and the oxygen supply stream 104 to form an oxygenation stream (e.g. "synthetic air") 106; combusting 312 the oxygenation stream 106 and the combustion fuel stream 108 in a primary combustion zone 110a of the combustor 110 to form a combustion products stream 112a with a temperature and a composition; sensing 314 the oxygen content of the combustion products stream 112a; and adjusting 316 the flow rate of the oxygen supply stream 104 until the combustion products stream 112a is substantially stoichiometric using the sensed oxygen content. In one embodiment, the method 300 includes sensing 314 the temperature of the combustion products stream 112a and adjusting 316 the flow rate of the primary diluent stream 102a to regulate the temperature of combustion using the sensed temperature. In one embodiment, the method includes directing 318a portion of the combustion products stream 112a to an enhanced oil recovery (EOR) process.

EXAMPLES

Some exemplary gas stream compositions are provided in the tables below as examples of gas streams at different stages of production in a single gas production field, or different gas production fields. Table 1 provides specific stream compositions and flow rates for a production well at or near the beginning of production.

TABLE 1

| | Start-up | | | | |
| --- | --- | --- | --- | --- | --- |
| Component | Stream 104 | Stream 108b | Stream 108a | Stream 102a | Stream 112 |
| $O_2$ | 95.59% | 0 | 0 | 0 | 0.44% |
| $CO_2$ | 0 | 0 | 0 | 76.23% | 61.83% |
| $CH_4$ | 0 | 0 | 100% | 0 | 0.00% |

TABLE 1-continued

| | Start-up | | | | |
|---|---|---|---|---|---|
| Component | Stream 104 | Stream 108b | Stream 108a | Stream 102a | Stream 112 |
| CO | 0 | 0 | 0 | 0 | 0.85% |
| OH | 0 | 0 | 0 | 0 | 0.12% |
| $H_2$ | 0 | 0 | 0 | 0 | 0.09% |
| $H_2O$ | 0 | 0 | 0 | 16.99% | 30.42% |
| Ar | 4.26% | 0 | 0 | 6.78% | 6.34% |
| Misc | 0.15% | 0 | 0 | 0 | 0.00% |
| Total | 100.00% | 0.00% | 100.00% | 100.00% | 100.09% |
| Pressure psig | 300 | 300 | 300 | 300 | 250 |
| Temp (° F.) | 755 | 500 | 160 | 540 | 1701.7 |
| LB Moles | 13474.1 | 0 | 6464.1 | 143859.5 | 163798 |
| Flow (lb/hr) | 436010 | 0 | 103425 | 6282874 | 6822309 |

Table 2 provides specific stream compositions and flow rates for a production well after $CO_2$ breakthrough.

TABLE 2

| | Post Breakthrough | | | | |
|---|---|---|---|---|---|
| Component | Stream 104 | Stream 108b | Stream 108a | Stream 102a | Stream 112 |
| $O_2$ | 95.59% | 0 | 0 | 0 | 0.014% |
| $CO_2$ | 0 | 88.16% | 0 | 0 | 64.15% |
| $CH_4$ | 0 | 5.21% | 100% | 0 | 0.00% |
| $C_2$ | 0 | 2.76% | 0 | 0 | 0.00% |
| $C_3$ | 0 | 1.25% | 0 | 0 | 0.00% |
| CO | 0 | 0% | 0 | 0 | 0.028% |
| OH | 0 | 0% | 0 | 0 | 0.004% |
| $H_2$ | 0 | 0% | 0 | 0 | 0.236% |
| $H_2O$ | 0 | 0% | 0 | 0 | 31.02% |
| $N_2$ | 0 | 1% | 0 | 0 | 0.84% |
| Ar | 4.26% | 0 | 0 | 0 | 0.40% |
| Misc | 0.15% | 1.77% | 0 | 0 | 3.3% |
| Total | 100.00% | 100.00% | 100.00% | 0.00% | 100.09% |
| Pressure psig | 300 | 300 | 300 | 300 | 250 |
| Temp (° F.) | 755 | 500 | 160 | 540 | 1701.7 |
| LB Moles | 13474.1 | 136739.7 | 171.8 | 0 | 150386 |
| Flow (lb/hr) | 412653 | 5639146 | 2748 | 0 | 6054547 |

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A system, comprising:
a combustor that includes a combustion fuel port, an oxygen supply port, a diluent supply port for providing a primary diluent, a combustion products output port, and a primary combustion zone and a burnout zone, wherein the combustor is configured to mix and combust an oxygenation stream and a combustion fuel stream within the primary combustion zone at a flame temperature and a primary residence time sufficient to produce a hot products stream, and configured to dilute the hot products stream with a secondary diluent stream within the burnout zone to form a combustion products stream having a lower temperature than the hot products stream, wherein the primary diluent and the secondary diluent have high concentrations of carbon dioxide and are split from a recycle stream;
an oxygen analyzer that measures an amount of oxygen in the combustion products stream after exiting the combustor through the combustion products output port; and
a control system comprising:
a first controller configured to receive a signal from the oxygen analyzer to thereby regulate the flow rate of an oxygen supply stream, and a second controller which controls a flow rate of the combustion fuel stream entering the combustor through the combustion fuel port, wherein the first controller and second controller adjust a proportioning factor based on the amount of oxygen in the combustion products stream determined by the signal from the oxygen analyzer to maintain an oxygen-to-fuel ratio in the combustor that creates near stoichiometric combustion;
a third controller configured to regulate the oxygen to CO2 ratio of the oxygenation stream by controlling the primary diluent stream flow rate to produce a primary combustion zone flame temperature configured to provide: an adequate margin between a combustor average velocity, a blow-off limit of the combustor, and the primary residence time within the combustor sufficient to produce the combustion products stream at about equilibrium conditions;
at least one temperature sensor operatively connected to an at least one CO2 flow regulation device, wherein the at least one temperature sensor is configured to measure the temperature of the combustion products stream and send a signal to the at least one CO2 flow regulation device, whereby the control system adjusts the secondary diluent stream flow rate based on the temperature of the combustion products stream to produce a desired temperature of the combustion products stream; and
an expansion device that receives the combustion products and expands the combustion products, whereby the expansion device is operatively connected to at least one load controller configured to control the flow rate of the combustion fuel stream to maintain a desired load condition in the expansion device.

2. The system of claim 1, wherein the temperature sensor measures the temperature of the combustion products stream after exiting the combustor through the combustion products output port.

3. The system of claim 1, wherein the control system controls the flow rate of the oxygen supply stream independent of an adjustment to the primary diluent supply stream.

4. The system of claim 1, wherein the control system adjusts the proportioning factor by adjusting the flow rate of the oxygen supply stream.

5. The system of claim 1, wherein a substantially stoichiometric combustion results in the combustion products stream including less than about 3.0 volume percent (vol %) oxygen and less than about 3.0 volume percent (vol %) NOx.

6. The system of claim 1, wherein the control system controls a desired combustor stoichiometry based on a condition of a load communicatively coupled to the combustion products output port changes.

7. The system of claim 1, wherein the oxygen analyzer is a lambda oxygen sensor.

8. The system of claim 1, wherein the oxygen analyzer is a wideband zirconia oxygen sensor.

* * * * *